US012584570B2

(12) United States Patent
Aoki et al.

(10) Patent No.: US 12,584,570 B2
(45) Date of Patent: Mar. 24, 2026

(54) MULTILAYER TUBULAR MOLDED BODY AND METHOD FOR PRODUCING MULTILAYER TUBULAR MOLDED BODY

(71) Applicant: TOYOX CO., LTD., Toyama (JP)

(72) Inventors: Daichi Aoki, Toyama (JP); Kenichi Numata, Toyama (JP)

(73) Assignee: TOYOX CO., LTD., Toyama (JP)

( * ) Notice: Subject to any disclaimer, the term of this patent is extended or adjusted under 35 U.S.C. 154(b) by 432 days.

(21) Appl. No.: 18/297,392

(22) Filed: Apr. 7, 2023

(65) Prior Publication Data

US 2023/0250900 A1 Aug. 10, 2023

Related U.S. Application Data

(63) Continuation of application No. PCT/JP2021/036592, filed on Oct. 10, 2021.

(30) Foreign Application Priority Data

Oct. 23, 2020 (JP) ................................ 2020-178442

(51) Int. Cl.
*F16L 11/04* (2006.01)
*B29C 48/09* (2019.01)
(Continued)

(52) U.S. Cl.
CPC ............... *F16L 11/04* (2013.01); *B29C 48/09* (2019.02); *B29C 48/21* (2019.02); (Continued)

(58) Field of Classification Search
CPC .......... F16L 11/087; F16L 11/04; F16L 11/12; F16L 2011/047; B29C 48/18; B29C 48/21
See application file for complete search history.

(56) References Cited

U.S. PATENT DOCUMENTS 4,627,844 A * 12/1986 Schmitt ................. A61L 29/085 428/36.6
5,570,711 A * 11/1996 Walsh ................... B32B 27/322 138/125

(Continued)

FOREIGN PATENT DOCUMENTS

JP H2-224763 A 9/1990
JP 2005-198858 A 7/2005

(Continued)

OTHER PUBLICATIONS

International Search Report received from the Japanese Patent Office in related Patent Application No. PCT/JP2021/036592 dated Dec. 21, 2021.

*Primary Examiner* — David Bochna
(74) *Attorney, Agent, or Firm* — The Marbury Law Group, PLLC

(57) ABSTRACT

To provide a multilayer tubular molded body, which has high chemical resistance and heat resistance and excellent adhesive strength, and a method for producing the same, a multilayer tubular molded body 1 has an inner layer 2 containing a polyolefin as a main component, an outer layer 3 containing polyvinyl chloride as a main component, and an interlayer 4, which is provided between the inner layer 2 and the outer layer 3, has a function to attach the inner layer 2 and the outer layer 3, and contains a first polyolefin having an aromatic ring on a side chain and a second polyolefin having an ester containing group on a side chain.

13 Claims, 5 Drawing Sheets

(51) Int. Cl.

| | |
|---|---|
| *B29C 48/21* | (2019.01) |
| *B29K 27/06* | (2006.01) |
| *B29K 105/00* | (2006.01) |
| *B29L 23/00* | (2006.01) |
| *F16L 11/08* | (2006.01) |

(52) U.S. Cl.

CPC ...... *B29K 2023/06* (2013.01); *B29K 2027/06* (2013.01); *B29K 2105/0094* (2013.01); *B29L 2023/22* (2013.01); *F16L 2011/047* (2013.01); *F16L 11/081* (2013.01)

(56) References Cited

U.S. PATENT DOCUMENTS 6,302,151 B1 * 10/2001 Maitay .................... F16L 11/08
138/125
7,275,543 B2 * 10/2007 Yang ..................... C08L 67/025
128/845

FOREIGN PATENT DOCUMENTS

| | | | |
|---|---|---|---|
| JP | 2006-503642 | A | 2/2006 |
| JP | 2007-236782 | A | 9/2007 |
| JP | 2020-165506 | A | 10/2020 |

* cited by examiner

MULTILAYER TUBULAR MOLDED BODY AND METHOD FOR PRODUCING MULTILAYER TUBULAR MOLDED BODY

RELATED APPLICATIONS

This application is a bypass continuation of PCT International Application No. PCT/JP2021/036592 filed on Oct. 10, 2021, which claims priority to Japanese Patent Application No. 2020-178442 filed Oct. 23, 2020, the entire contents of both of which are incorporated herein by reference for all purposes.

TECHNICAL FIELD

The present invention relates to a multilayer tubular molded body and a method for producing the multilayer tubular molded body.

BACKGROUND ART

Tubular molded bodies made of polyvinyl chloride have been widely used because of their excellent pliability (flexibility). However, although tubular molded bodies may be required to have high chemical resistance and heat resistance in certain areas (such as food processing, cosmetic production and chemical production), the tubular molded bodies made of polyvinyl chloride cannot meet this requirement.

Polyolefins are superior in chemical resistance and heat resistance to polyvinyl chloride. Therefore, using a tubular molded body made of polyvinyl chloride as the outer layer and a polyolefin as the inner layer is considered to meet the above requirement.

However, polyvinyl chloride is a polar polymer, and a polyolefin is a non-polar polymer. That is, the polarity is largely different between polyvinyl chloride and polyolefins. Therefore, it is difficult to directly attach these.

Accordingly, Patent Literature 1 discloses a tube having polyvinyl chloride as the outer layer and a polyolefin as the inner layer, which are attached by a maleic anhydride modified ethylene-vinyl acetate copolymer as the interlayer.

However, the investigations of the present inventors found that in the tube in the Patent Literature 1, the adhesiveness between the outer layer and the inner layer was still insufficient.

CITATION LIST

Patent Literature

Patent Literature 1: Japanese Unexamined Patent Application Publication No. 2007-236782

SUMMARY OF INVENTION

Technical Problem

An object of the present invention is to provide a multilayer tubular molded body, which has high chemical resistance and heat resistance and excellent adhesive strength, and a method for producing the same.

Solution to Problem

The object described above is achieved by the inventions in (1) to (15) described below.

(1) A multilayer tubular molded body, characterized by having, an inner layer containing a polyolefin as a main component, an outer layer containing polyvinyl chloride as a main component, and an interlayer, which is provided between the inner layer and the outer layer, has a function to attach the inner layer and the outer layer, and contains a first polyolefin having an aromatic ring on a side chain and a second polyolefin having an ester containing group on a side chain.

(2) The multilayer tubular molded body according to (1) above, wherein the ratio of the amount of the first polyolefin and the amount of the second polyolefin contained in the interlayer is 95:5 to 50:50 by mass.

(3) The multilayer tubular molded body according to (1) or (2) above, wherein the total amount of the first polyolefin and the second polyolefin contained in the interlayer is 75 mass % or more.

(4) The multilayer tubular molded body according to any one of (1) to (3) above, wherein the first polyolefin includes a styrene grafted polyolefin and polystyrene.

(5) The multilayer tubular molded body according to any one of (1) to (4) above, wherein the second polyolefin includes a maleic anhydride modified ethylene-vinyl acetate copolymer.

(6) The multilayer tubular molded body according to any one of (1) to (5) above, wherein the amount of the polyolefin contained in the inner layer is 75 mass % or more.

(7) The multilayer tubular molded body according to any one of (1) to (6) above, wherein the polyolefin includes at least one selected from the group consisting of polyethylene and polypropylene.

(8) The multilayer tubular molded body according to any one of (1) to (7) above, wherein the amount of the polyvinyl chloride contained in the outer layer is 40 to 70 wt %.

(9) The multilayer tubular molded body according to any one of (1) to (8) above, wherein the ratio of the thickness of the outer layer to the thickness of the inner layer is 1 to 10.

(10) The multilayer tubular molded body according to any one of (1) to (9) above, wherein the adhesive strength of the outer layer to the inner layer is 10 N/25 mm or more.

(11) The multilayer tubular molded body according to any one of (1) to (10) above, which is an integrated article by co-extrusion molding of the inner layer, the interlayer and the outer layer.

(12) A method for producing the multilayer tubular molded body according to (11) above, the method being characterized by obtaining the multilayer tubular molded body by co-extrusion of an inner layer-forming material containing the polyolefin, an outer layer-forming material containing the polyvinyl chloride, and an interlayer-forming material containing the first polyolefin and the second polyolefin.

(13) The method for producing the multilayer tubular molded body according to (12) above, wherein the absolute value of a difference between the melting point of the inner layer-forming material and the melting point of the outer layer-forming material is 1 to 40° C.

(14) The method for producing the multilayer tubular molded body according to (12) or (13) above, wherein the absolute value of a difference between the melting point of the interlayer-forming material and the melting point of the inner layer-forming material is 5 to 35° C.

(15) The method for producing the multilayer tubular molded body according to any one of (12) to (14) above, wherein the absolute value of a difference between the melt flow index of the interlayer-forming material and the melt flow index of the inner layer-forming material is 4.5 to 10 g/10 min.

Advantageous Effect of Invention

According to the present invention, it is possible to obtain a multilayer tubular molded body which has high chemical resistance and heat resistance and excellent adhesive strength.

DETAILED DESCRIPTION OF EMBODIMENTS

The multilayer tubular molded body and the method for producing the multilayer tubular molded body in the present invention will now be described in detail based on suitable embodiments shown in the accompanying drawings.

<Multilayer Tubular Molded Body>

Figure 1:
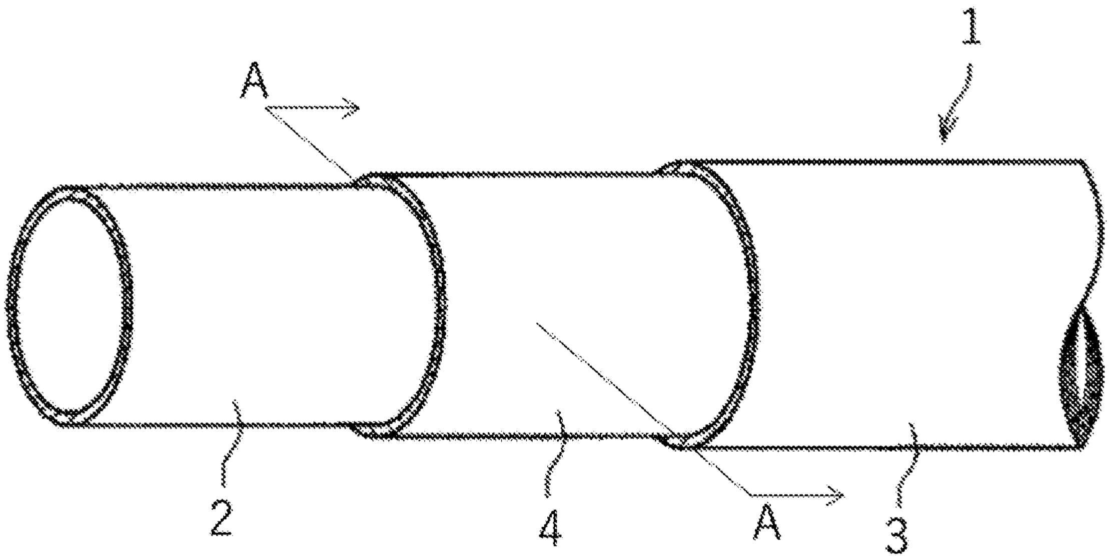
FIG. 1 is a perspective view which shows a multilayer tubular molded body in an embodiment of the present invention, which is partially cut.
Figure 2:
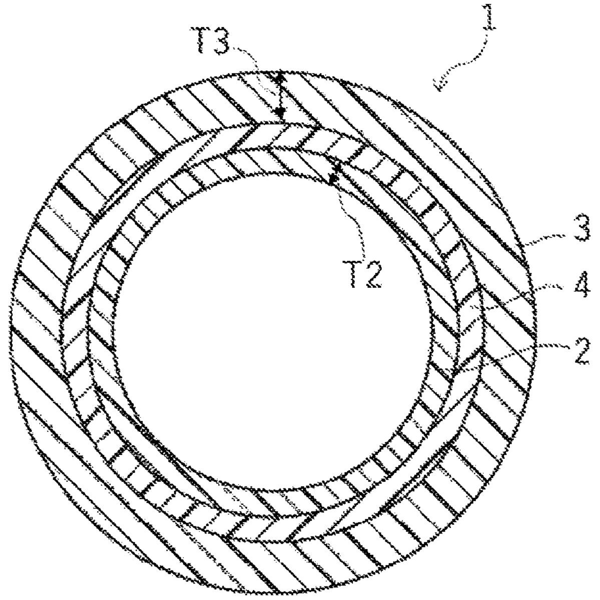
FIG. 2 is a cross-sectional view taken along the line A-A in FIG. 1.

FIG. 1 is a perspective view which shows a multilayer tubular molded body in an embodiment of the present invention, which is partially cut, and FIG. 2 is a cross-sectional view taken along the line A-A in FIG. 1.

The multilayer tubular molded body 1 shown in FIG. 1 has an inner layer 2, an outer layer 3, and an interlayer 4 provided between the inner layer 2 and the outer layer 3.

The structure of each layer will now be described in turn.

<<Inner Layer 2>>

The inner layer 2 is a layer containing a polyolefin as a main component. Polyolefins have excellent chemical resistance and heat resistance. Therefore, high chemical resistance and heat resistance can be imparted to the multilayer tubular molded body 1 by providing the inner layer 2 containing a polyolefin as a main component.

Examples of the polyolefin include polyethylene such as low density polyethylene (LDPE), linear low density polyethylene (LLDPE), very low density polyethylene (VLDPE), medium density polyethylene (MDPE) and high density polyethylene (HDPE), very high density polyethylene (VHDPE), polypropylene, polybutene, an ethylene α-olefin copolymer and the like. These can be used individually, or two or more of these can be used in combination.

Among these, the polyolefin includes preferably at least one selected from the group consisting of polyethylene and polypropylene, more preferably at least one selected from the group consisting of LDPE, HDPE, VHDPE and polypropylene, and further preferably HDPE. Using these polyolefins, the heat resistance of the inner layer 2 is easily improved.

The weight average molecular weight of the polyolefin is preferably about 10,000 to 400,000 and more preferably about 50,000 to 110,000.

It should be noted that the weight average molecular weight is a value converted using standard polystyrene measured by the gel permeation chromatography (GPC) method in the description.

Other polymers and various additives may be also added to the polyolefin as long as the characteristics of the inner layer 2 are not lost.

Examples of other polymers include a styrene-based block copolymer, polyacrylic acid, polyacrylic acid esters and the like.

Examples of additives include antioxidants, heat stabilizers, light stabilizers, UV absorbers, neutralizers, lubricants, anti-fogging agents, slipping agents, cross-linking agents, cross-linking aids, dye, pigment, flame retardants, dispersants, anti-static agents, anti-blocking agents, inorganic fillers (such as silica, talc and mica) and the like.

The amount of the polyolefin contained in the inner layer 2 is preferably 75 mass % or more, more preferably 85 mass % or more, further preferably 95 mass % or more, and may be 100 mass %. In this case, characteristics based on the polyolefin can be adequately imparted to the inner layer 2.

<<Outer Layer 3>>

The outer layer 3 is a layer containing polyvinyl chloride as a main component. Polyvinyl chloride has excellent pliability. Pliability (flexibility) easily becomes low in the inner layer 2 containing a polyolefin as a main component; however, the whole multilayer tubular molded body 1 can secure high pliability (flexibility) by combining the outer layer 3 containing polyvinyl chloride as a main component.

It should be noted that the polyvinyl chloride may be modified. Examples of such modified polyvinyl chloride include acrylic modified polyvinyl chloride, polyurethane modified polyvinyl chloride, ethylene-vinyl acetate copolymer modified polyvinyl chloride and the like.

The weight average molecular weight of the polyvinyl chloride is preferably about 40,000 to 200,000 and more preferably about 80,000 to 160,000.

From the viewpoint of enhancing the pliability of the outer layer 3, various plasticizers may be added to the polyvinyl chloride.

Examples of plasticizers include phthalic acid esters such as dimethyl phthalate (DMP), diethyl phthalate (DEP), dibutyl phthalate (DBP), di-2-ethylhexyl phthalate (DEHP), di-n-decyl phthalate (DnDP) and diisononyl phthalate (DINP), adipic acid esters such as diisobutyl adipate (DIBA), dioctyl adipate (DOA), di-2-ethylhexyl adipate (DEHA) and diisononyl adipate (DINA), trimellitic acid esters such as trimellitic acid triesters, polyester plasticizers and the like.

In addition, various additives mentioned in the inner layer 2 may be added to the polyvinyl chloride and the plasticizer as long as the characteristics of the outer layer 3 are not lost.

The amount of the polyvinyl chloride contained in the outer layer 3 is preferably about 40 to 70 mass % and more preferably about 45 to 65 mass %. In this case, pliability based on the polyvinyl chloride can be adequately imparted to the outer layer 3.

As shown in FIG. 2, the ratio of the thickness T3 [mm] of the outer layer 3 to the thickness T2 [mm] of the inner layer 2 (T3/T2) is preferably about 1 to 10 and more preferably about 3 to 7. When T3/T2 is within the above range, the pliability of the multilayer tubular molded body 1 is sufficiently enhanced, and also excellent chemical resistance and heat resistance can be imparted to the multilayer tubular molded body 1.

The specific value of T2 is not particularly limited, and is preferably about 0.1 to 3 mm and more preferably about 0.2 to 0.5 mm.

The specific value of T3 is also not particularly limited, and is preferably about 0.5 to 4 mm and more preferably about 0.7 to 3 mm.

The interlayer 4 is provided between the inner layer 2 and the outer layer 3. This interlayer 4 has a function to attach the inner layer 2 and the outer layer 3. It should be noted that the main function of the interlayer 4 is an adhesive function, and the interlayer 4 may further display other functions such as a cushioning function, an anti-kinking function, a function to suppress gas permeation, a UV cutting function and a function to improve heat resistance.

The interlayer 4 contains a first polyolefin having an aromatic ring on a side chain and a second polyolefin having an ester containing group on a side chain.

The aromatic ring in the first polyolefin has large electron bias, and a portion of low electron density (positively charged portion) exists therein. Meanwhile, chlorine elements in the polyvinyl chloride have a large electron affinity, and is negatively charged because the electron density is increased. Because of this, chlorine elements in the polyvinyl chloride are strongly attracted to the aromatic ring in the first polyolefin, which are stable by the van der Waals force. That is, the outer layer 3 and the interlayer 4 seem to be attached by a high interaction of the first polyolefin and the polyvinyl chloride.

Meanwhile, the ester containing group in the second polyolefin includes a C═O bond and a C—O bond (or C—O—C bond) next to each other. The C═O bond has a higher electron density than that of the C—O bond, and space is generated between them. Hydrogen elements in the polyolefin are strongly attracted to this space, which are stable because hydrogen bonds are generated. That is, the inner layer 2 and the interlayer 4 seem to be attached by a high interaction of the second polyolefin and the polyolefin.

In addition, both the first polyolefin and the second polyolefin have a saturated hydrocarbon structure on the main chain thereof. These have a high affinity for each other, and are not easily phase-separated.

Polyvinyl chloride is a polar polymer, and a polyolefin is a non-polar polymer. Because the polarity is largely different between polyvinyl chloride and polyolefins, it is intrinsically difficult to directly attach the inner layer 2 and the outer layer 3.

In the present invention, however, by providing the interlayer 4 including two types of polyolefin having a functional group on a side chain (adhesive polyolefin), excellent adhesiveness between the inner layer 2 and the outer layer 3 via the interlayer 4 seems to be developed by the above-described actions.

Examples of the aromatic ring in the first polyolefin include a benzene ring, a naphthalene ring, an anthracene ring, a pyridine ring, a furan ring and the like. Among these, the benzene ring is preferred from the viewpoint of suppressing a decrease in the affinity for the second polyolefin.

Examples of such first polyolefin include a styrene grafted polyolefin, polystyrene and the like.

Among these, the first polyolefin preferably includes a styrene grafted polyolefin and polystyrene. Such first polyolefin can more highly interact with polyvinyl chloride. In this case, the first polyolefin may be also a mixture (e.g., polymer alloy) of a styrene grafted polyolefin and polystyrene, or may also have a core/shell structure having polystyrene as the core and a styrene grafted polyolefin as the shell.

Examples of the ester containing group in the second polyolefin include an alkyl ester group, an aryl ester group, a maleic anhydride group, a succinic anhydride group, a phthalic anhydride group and the like. Among these, at least one selected from the group consisting of an alkyl ester group and a maleic anhydride group is preferred from the viewpoint of suppressing a decrease in the affinity for the first polyolefin.

Examples of such second polyolefin include a maleic anhydride modified ethylene-vinyl acetate copolymer, maleic anhydride modified polyvinyl alcohol and the like.

Among these, the second polyolefin preferably includes an ethylene-vinyl acetate copolymer. Such second polyolefin can more highly interact with the polyolefin.

The amount of maleic anhydride added or grafted to the ethylene-vinyl acetate copolymer is preferably about 0.0001 to 15 parts by mass with respect to 100 parts by mass of the ethylene-vinyl acetate copolymer, and more preferably about 0.001 to 10 parts by mass.

The mass ratio of the amount of the first polyolefin and the amount of the second polyolefin contained in the interlayer 4 (first polyolefin:second polyolefin) is preferably about 95:5 to 50:50, more preferably about 90:10 to 50:50, and further preferably about 90:10 to 80:20. When the interlayer 4 contains the first polyolefin and the second polyolefin in such amount ratio, the adhesiveness of the inner layer 2 and the outer layer 3 are developed in a balanced manner.

From the viewpoint of enhancing the viscosity and adhesiveness of the interlayer 4, various tackifiers (viscosity improving agents) may be added to the first polyolefin and the second polyolefin.

Examples of the tackifier include natural tackifiers such as rosin-based, rosin derivative-based, terpene resin-based and terpene derivative-based tackifiers, synthetic tackifiers such as petroleum resin-based, styrene resin-based, coumarone-indene resin-based, phenol resin-based and xylene resin-based tackifiers, and the like.

In addition, various other polymers and additives mentioned in the inner layer 2 may be added to the first polyolefin and the second polyolefin as long as the characteristics of the interlayer 4 are not lost.

The total amount of the first polyolefin and the second polyolefin contained in the interlayer 4 is preferably 75 mass % or more, more preferably 85 mass % or more, further preferably 95 mass % or more, and may be 100 mass %. In this case, characteristics based on the first polyolefin and the second polyolefin can be adequately imparted to the interlayer 4.

It should be noted that the amounts of the first polyolefin and the second polyolefin contained in the interlayer 4 may vary along the direction of the thickness. For example, the interlayer 4 may be also formed from a gradient material in which the amount of the first polyolefin decreases from the outer layer 3 side towards the inner layer 2 side, and the amount of the second polyolefin increases from the outer layer 3 side towards the inner layer 2 side.

In addition, changes in the amounts of the first polyolefin and the second polyolefin along the thickness direction of the interlayer 4 may be continuous or stepwise.

The specific value of the thickness of the interlayer 4 is not particularly limited, and is preferably about 0.2 to 2 mm and more preferably about 0.2 to 1 mm. In this case, the multilayer tubular molded body 1 is prevented from becoming thicker than required, and also high adhesiveness to the inner layer 2 and the outer layer 3 can be maintained.

The adhesive strength of the outer layer 3 to the inner layer 2 are preferably 10 N/25 mm or more, more preferably 20 N/25 mm or more and further preferably 40 N/25 mm or more. It should be noted that the upper limit of the adhesive strength is commonly about 100 N/25 mm. In this case, it can be judged that separation between the inner layer 2 and the outer layer 3 is sufficiently difficult to occur in the multilayer tubular molded body 1. Therefore, the multilayer tubular molded body 1 having such adhesive strength is suitably used as a tubular molded body positioned in an operating portion.

Such multilayer tubular molded body 1 is preferably an integrated article by co-extrusion molding of the inner layer 2, the interlayer 4 and the outer layer 3. In such multilayer tubular molded body 1, the adhesiveness between the inner layer 2 and the outer layer 3, and the interlayer 4 are more easily improved.

The multilayer tubular molded body 1 as described above has sufficient pliability and excellent chemical resistance and heat resistance. Therefore, the multilayer tubular molded body 1 is suitably used in the areas such as food processing, cosmetic production and chemical production.

The method for producing the multilayer tubular molded body in the present invention is a method for producing the multilayer tubular molded body 1 as an integrated article by co-extrusion molding of the inner layer 2, the interlayer 4 and the outer layer 3.

Specifically, an inner layer-forming material containing the above polyolefin, an outer layer-forming material containing the above polyvinyl chloride, and an interlayer-forming material containing the above first polyolefin and the above second polyolefin are co-extruded to obtain a multilayer tubular molded body 1 having a three layer structure. By the co-extrusion, a multilayer tubular molded body 1 having sufficiently high adhesiveness between the inner layer 2 and the outer layer 3, and the interlayer 4 can be relatively easily produced.

In addition, from the viewpoint of enhancing the adhesive strength between the inner layer 2 and the outer layer 3, and the interlayer 4, it is preferred to make a design so that a predetermined relationship of the melting point and melt flow index (MFI) of each layer-forming material will be met.

The absolute value of a difference between the melting point of the inner layer-forming material and the melting point of the outer layer-forming material is preferably about 1 to 40° C. and more preferably about 3 to 25° C.

The absolute value of a difference between the melting point of the interlayer-forming material and the melting point of the inner layer-forming material is preferably about 5 to 35° C. and more preferably about 10 to 25° C.

The specific value of the melting point of the inner layer-forming material is preferably about 120 to 150° C. and more preferably about 125 to 140° C.

The specific value of the melting point of the outer layer-forming material is preferably about 100 to 160° C. and more preferably about 120 to 155° C.

The specific value of the melting point of the interlayer-forming material is preferably about 130 to 170° C. and more preferably about 140 to 160° C.

The absolute value of a difference between the MFI of the interlayer-forming material and the MFI of the inner layer-forming material is preferably about 1 to 15 g/10 min and more preferably about 4.5 to 10 g/10 min.

The specific value of the MFI of the inner layer-forming material is preferably about 0.05 to 0.3 g/10 min and more preferably about 0.1 to 0.2 g/10 min.

The specific value of the MFI of the interlayer-forming material is preferably about 1 to 15 g/10 min and more preferably about 4.5 to 10 g/10 min.

The multilayer tubular molded body 1 can be also produced by, after forming the inner layer 2, laminating the interlayer 4 and the outer layer 3 on the outer circumferential surface side of the inner layer 2 by co-extrusion molding.

In this case, it is preferred that the outer circumferential surface of the inner layer 2 be modified by plasma treatment, that is, a functional group to enhance the adhesiveness with the interlayer 4 (hereinafter described as an "adhesive functional group") be introduced. Because of this, an affinity between the inner layer 2 and the interlayer 4 can be enhanced to further improve the adhesiveness of these.

Examples of the adhesive functional group introduced to the outer circumferential surface of the inner layer 2 include hydrophilic groups such as hydroxy group, carbonyl group and carboxy group, and hydrophobic groups such as alkyl group and vinyl group. These can be used individually, or two or more of these can be used in combination.

When introducing a hydrophilic group as the adhesive functional group, furthermore a divinyl monomer and a silane coupling agent may be allowed to react with this hydrophilic group. Therefore, a polymerizable functional group can be introduced to the outer circumferential surface of the inner layer 2. In this case, the adhesiveness between the inner layer 2 and the interlayer 4 are more easily enhanced.

Trimethylvinylsilane may be also added to a gas for plasma treatment. In this case, a vinyl group can be directly introduced to the outer surface of the polyolefin such as polyethylene.

The plasma treatment to the outer circumferential surface of the inner layer 2 can be suitably carried out using, for example, plasma treatment equipment described below.

Figure 3:
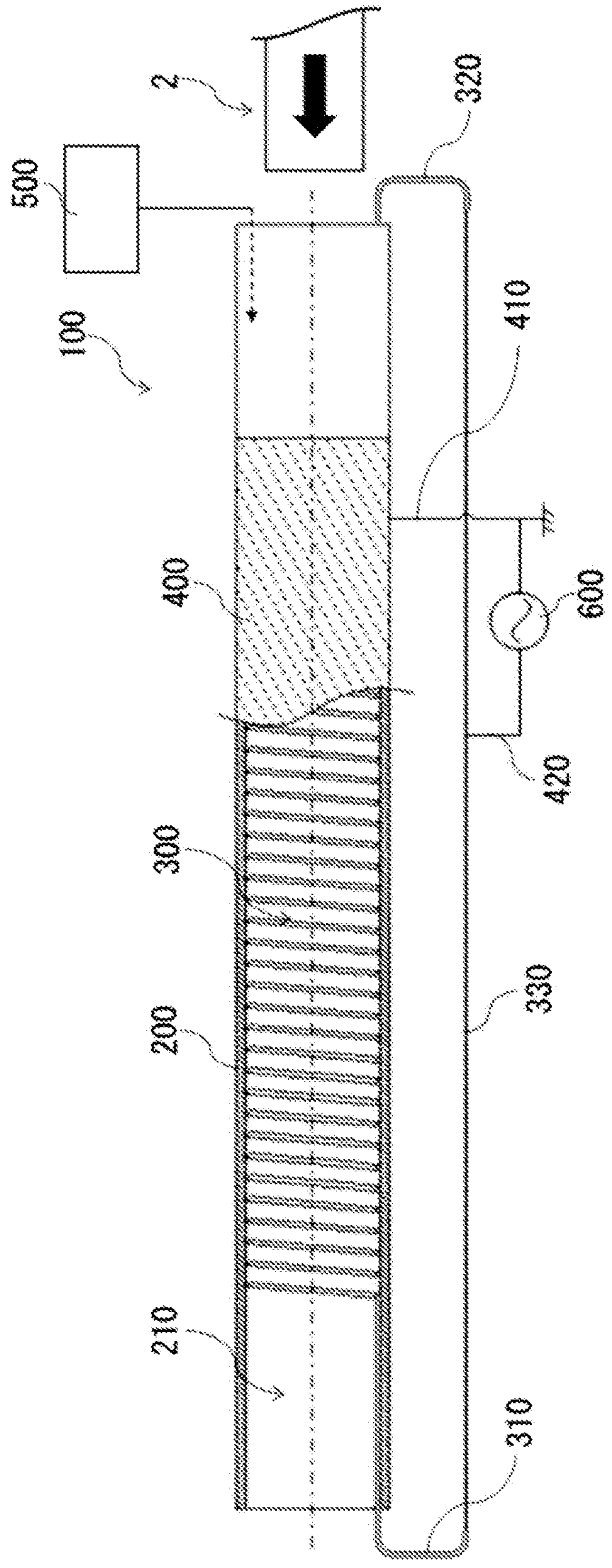
FIG. 3 is a schematic view which shows the overall structure of plasma treatment equipment.
Figure 4:
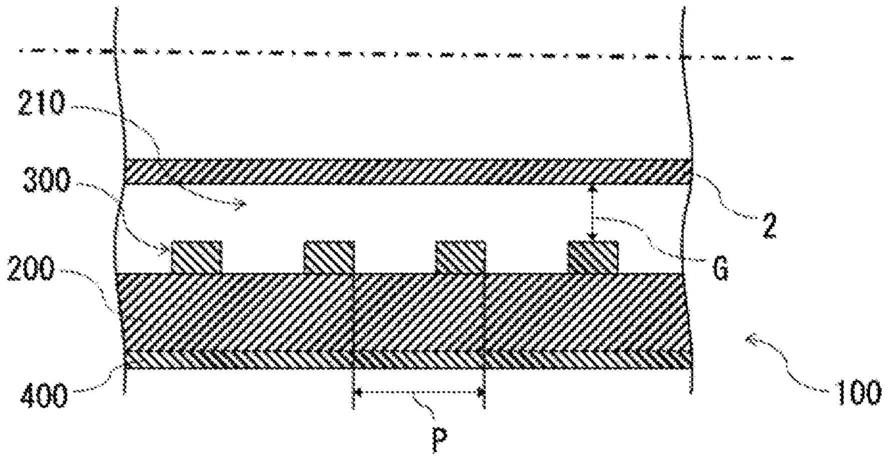
FIG. 4 is a cross-sectional view which shows a state in which the outer circumferential surface of the inner layer is plasma-treated using the plasma treatment equipment in FIG. 3.

FIG. 3 is a schematic view which shows the overall structure of plasma treatment equipment, and FIG. 4 is a cross-sectional view which shows a state in which the outer circumferential surface of the inner layer is plasma-treated using the plasma treatment equipment in FIG. 3.

The plasma treatment equipment 100 shown in FIG. 3 has a cylindrical dielectric 200 provided with an inner cavity 210, a coiled internal electrode 300 positioned on the inner circumferential surface side of the dielectric 200 and wound along the axial direction, an outer electrode 400 positioned on the outer circumferential surface side of the dielectric 200 and applying an AC voltage between the dielectric 200 and the internal electrode 300, and a gas supply part 500 supplying to the inner cavity 210 a gas to generate plasma by applying an AC voltage.

In addition, a wire 330 connects between a leader line 310 on one end of the internal electrode 300 and a leader line 320 on the other end, and an AC power supply 600 is connected thereto via a leader line 410 and a wire 420. The outer electrode 400 is grounded via the leader line 410, and the wire 420 and the wire 330 are electrically conducted. It should be noted that the leader line 310, the leader line 320, the wire 330, the wire 420 and the leader line 410 are covered with an insulating material.

An AC flows through the internal electrode 300 while supplying a gas from the gas supply part 500 into the inner cavity 210 to generate a plasma discharge. Consequently, plasma is intensively generated in the inner cavity 210, and the inner layer 2 is allowed to pass through this inner cavity 210 to selectively plasma-treat the outer circumferential surface of the inner layer 2.

Each structure will now be described in order.

<Dielectric 200>

As the constituent material for the dielectric 200, a dielectric material having relative permittivity (Sr) and heat resistance as high as possible is preferred, and ceramics such as quartz (Sr=3.8), alumina (Sr=9.4) and boron nitride (Sr=12) are more preferred.

The thickness of the dielectric 200 is not particularly limited, and is preferably about 0.5 to 10 mm and more preferably about 1 to 5 mm.

The length of the dielectric 200 is also not particularly limited, and is preferably about 50 to 500 mm and more preferably about 100 to 300 mm.

<Internal Electrode 300>

The internal electrode (applied electrode) 300 is positioned along the axial direction of the dielectric 200, and comes into contact with the inner circumferential surface of the dielectric 200. This internal electrode 300 is formed from a coiled body obtained by winding a linear or strip wire rod in a coiled form along the axial direction of the dielectric 200.

The internal electrode is also considered to be formed from a plurality of rod-shaped bodies positioned along the axial direction of the dielectric 200 and arranged along the circumferential direction, a plurality of ring-shaped bodies positioned along the axial direction of the dielectric 200 and concentrically with the dielectric 200, and the like.

However, when the internal electrode is formed from rod-shaped bodies, it is required to adjust the number of the rod-shaped bodies depending on the size (outer diameter) of the inner layer 2, in order to directly treat the inner layer 2 in a cylindrical form. In addition, because the rod-shaped bodies are positioned along the axial direction of the dielectric 200 (the insertion direction of the inner layer 2), there is a concern that unevenness in the treatment will occur along the circumferential direction of the outer circumferential surface of the inner layer 2.

Meanwhile, when the internal electrode is formed from ring-shaped bodies, it is required to increase the number of ring-shaped bodies, in order to gain time for plasma treatment. In this case, it is required to position ring-shaped bodies so that the bodies next to each other will not overlap, in order that unevenness in the treatment will not occur along the axial direction.

However, when the internal electrode 300 is formed from a coiled body, plasma treatment can be carried out without unevenness along the circumferential direction and the axial direction of the outer circumferential surface of the inner layer 2.

The pitch of wire rods forming the internal electrode 300 (P in FIG. 4) is preferably about 0.5 to 10 mm and more preferably about 1 to 7.5 mm. In this case, gaps between the wound wire rods can be sufficiently filled with the generated plasma, and accordingly it is easy to more evenly plasma-treat the outer circumferential surface of the inner layer 2.

The cross-sectional shape of a wire rod forming the internal electrode 300 in the direction perpendicular to the longitudinal direction may be a circle, but is preferably a shape having angles such as a rectangle (square) as shown in FIG. 4, triangle or M letter shape. In this case, a plasma discharge is easily generated from the angle portions of the wire rod towards the inner layer 2.

The cross-section area of a wire rod is not particularly limited, and is preferably about 0.001 to 9 $mm^2$ and more preferably about 0.005 to 2 $mm^2$.

The length of the coiled portion (portion except for the leader lines 310 and 320) of the internal electrode 300 is also not particularly limited, and is preferably about 25 to 250 mm and more preferably about 50 to 200 mm.

The constituent material for the internal electrode 300 (wire rod) may be an electrically conductive material, and is not particularly limited. Examples thereof include iron, stainless steel, copper, silver, gold, platinum, palladium, tungsten, nickel, aluminum, carbon and the like. These can be used individually, or two or more of these can be used in combination.

<Outer Electrode 400>

The outer electrode (ground electrode) 400 is positioned along the axial direction of the dielectric 200 and comes into contact with the outer circumferential surface of the dielectric 200. This outer electrode 400 is formed from a net or foil (sheet)-shaped cylindrical body positioned along the axial direction of the dielectric 200.

By the outer electrode 400 formed from the cylindrical body, coupled with the action of the internal electrode 300 formed from a coiled body, the outer circumferential surface of the inner layer 2 can be plasma-treated without unevenness along the circumferential direction.

The thickness of the outer electrode 400 is not particularly limited, and is preferably about 0.01 to 1 mm and more preferably about 0.05 to 0.5 mm.

In addition, the length of the outer electrode 400 is preferably a size which can encompass the coiled portion of the internal electrode 300.

The constituent material of the outer electrode 400 may be an electrically conductive material, and is not particularly limited. Examples thereof include iron, stainless steel, copper, iron, gold, platinum, palladium, tungsten, nickel, aluminum, carbon and the like. These can be used individually, or two or more of these can be used in combination.

According to the plasma treatment equipment 100 having the structure described above, plasma can be allowed to pass through the inner cavity 210 without the deformation of the inner layer 2, and thus the outer circumferential surface thereof can be selectively plasma-treated. In addition, unevenness in the treatment of the outer circumferential surface of the inner layer 2 along the circumferential direction does not easily occur.

In plasma treatment equipment having a structure in which electrodes are positioned on the inner side and outer side of the inner layer 2, the inner circumferential surface of the inner layer 2 can be also involuntarily plasma-treated. When the inner circumferential surface of the inner layer 2 is plasma-treated, there is a risk that the functions of the inner layer 2 (e.g., chemical resistance, water repellency, antifouling properties and extractability) will be reduced or disappear. Therefore, it is preferred to avoid the plasma treatment of the inner circumferential surface of the inner layer 2. However, according to the plasma treatment equipment 100 in the present embodiment, such disadvantage can be prevented.

The method for producing the multilayer tubular molded body 1 using such plasma treatment equipment 100 has a step of allowing the inner layer 2 to pass through the inner cavity 210 of the dielectric 200 to plasma-treat the outer surface thereof (plasma treatment step) and a step of covering the outer circumference of the inner layer 2 with the interlayer 4 and the outer layer 3 (covering step).

[1] Plasma Treatment Step

First, a gas (hereinafter, described as "gas for plasma treatment") is supplied from the gas supply part 500 into the inner cavity 210 of the plasma treatment equipment 100. In this state, an AC voltage is applied between the internal electrode 300 and the outer electrode 400 from the AC power supply 600. Because of this, a plasma discharge is generated in the inner cavity 210 and plasma is intensively generated.

Next, the inner layer 2 is allowed to pass through the inner cavity 210. Therefore, the outer circumferential surface of the inner layer 2 is plasma-treated serially from the end portion thereof.

At this time, a separation distance between the internal electrode 300 and the inner layer 2 (G in FIG. 4) is not particularly limited, and is preferably about 1 to 10 mm, more preferably about 1 to 5 mm and further preferably about 1 to 3 mm. When the separation distance between the internal electrode 300 and the inner layer 2 is set within the above range, changes in the quality and deterioration of the inner layer 2 are prevented and also the outer circumferential surface thereof can be selectively plasma-treated.

By this plasma treatment, the outer circumferential surface of the inner layer 2 is excited, and an adhesive functional group can be introduced by the substitution of an element existing on the outer circumferential surface depending on the type of gas.

Examples of the gas for plasma treatment include noble gases such as argon and helium, carbon dioxide, carbon monoxide, oxygen, tetrafluoromethane, methane, ethane and the like. These can be used individually, or two or more of these can be used as a mixed gas.

For example, when a carboxy group is introduced to the outer circumferential surface of the inner layer 2 formed from high density polyethylene (HDPE), it is preferred that the separation distance G between the internal electrode 300 and the inner layer 2 be set to 1 to 2 mm, and a mixed gas including argon, carbon dioxide and methane in an amount ratio of 20 to 99:80 to 0.5:2 to 0 be used as the gas for plasma treatment.

The maximum value of the AC voltage is preferably about 1 to 20 kV and more preferably about 5 to 10 kV.

The frequency of the AC voltage is preferably about 1 to 30 kHz and more preferably about 5 to 15 kHz.

The time to apply the AC voltage is preferably about 0.1 to 20 seconds and more preferably about 1 to 10 seconds.

By plasma treatment on such conditions, a target adhesive functional group can be more accurately introduced to the outer circumferential surface of the inner layer 2.

[2] Covering Step

Next, the interlayer 4 and the outer layer 3 are formed on the outer circumferential surface of the inner layer 2 by co-extrusion molding, for example. Therefore, the multilayer tubular molded body 1 is obtained.

Because an adhesive functional group is previously introduced to the outer circumferential surface of the inner layer 2 by such method, the interlayer 4 can be directly and firmly attached to the inner layer 2.

It should be noted that after the outer circumference of the inner layer 2 is covered with the interlayer 4 and the outer layer 3, the interlayer 4 and the outer layer 3 may be heat-treated depending on the constituent materials of the interlayer 4 and the outer layer 3 to enhance the adhesiveness between the inner layer 2 and the interlayer 4.

Furthermore, the multilayer tubular molded body 1 can be also produced by, after forming the inner layer 2, sequentially laminating the interlayer 4 and the outer layer 3 on the outer circumferential surface of the inner layer 2 by extrusion molding.

In this case, one or both of the outer circumferential surface of the inner layer 2 and the outer circumferential surface of the interlayer 4 are preferably modified by plasma treatment. Because of this, an affinity between the inner layer 2 and the interlayer 4 or an affinity between the interlayer 4 and the outer layer 3 is enhanced, and the adhesiveness of these can be further improved.

This plasma treatment can be carried out in the same manner using the above plasma treatment equipment 100.

The multilayer tubular molded body and the method for producing the multilayer tubular molded body in the present invention have been described. It should be noted that the present invention is not limited to the above-described structures in the embodiments.

In the multilayer tubular molded body in the present invention, any structure may be added to the above-described structure in the embodiment, and the above-described structure may be replaced with any structure displaying the same function.

In addition, in the method for producing the multilayer tubular molded body in the present invention, any step may be added to the above-described structure in the embodiment, and the above-described structure may be replaced with any step displaying the same function.

The multilayer tubular molded body in the present invention can be used as, for example, a tube, a hose, etc.

In addition, the multilayer tubular molded body in the present invention can be a pressure resistant hose by providing a reinforcement layer formed from, for example, a reinforcement wire rod and the outermost layer as needed.

Figure 5:
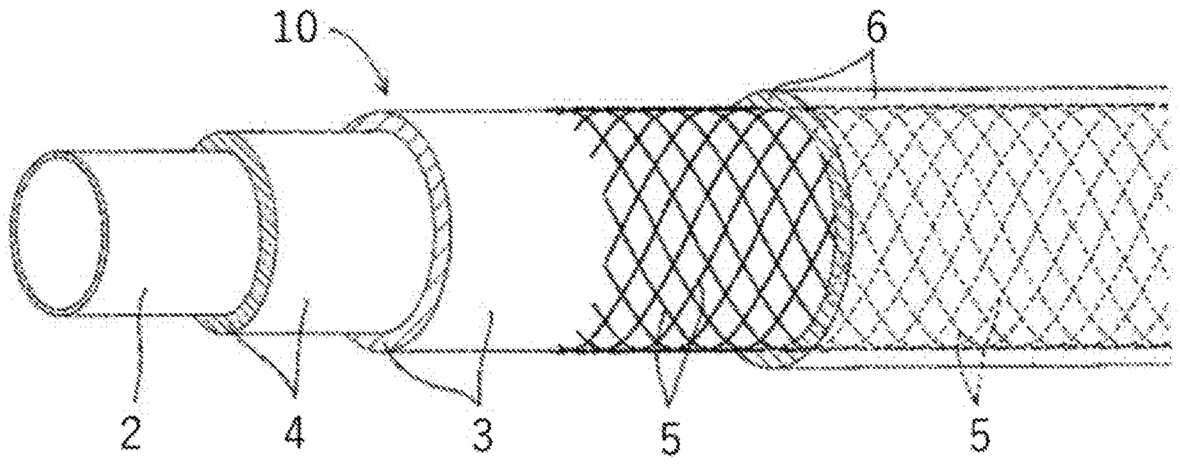
FIG. 5 is a perspective view which shows the structure of a pressure resistant hose, which is partially cut.

An example of such pressure resistant hose is shown in FIG. 5. FIG. 5 is a perspective view which shows the structure of a pressure resistant hose, which is partially cut.

The pressure resistant hose 10 shown in FIG. 5 includes an inner layer 2, an outer layer 3 and an interlayer 4, and has a structure in which the reinforcement layer 5 and the outermost layer 6 are provided on the outer side of the outer layer 3 in this order.

Examples of the reinforcement wire rod forming the reinforcement layer 5 include a plurality of or single braid including, for example, polyester, nylon (registered trademark) or aramid fiber and the like, a multifilament obtained by weaving thin monofilaments, olefin resin, a monofilament including polyester resin and the like, a flat yarn (or tape yarn) including a tape-shaped yarn, a metal wire including stainless steel and the like, or a coil including a hard material classified into stainless steel and the like.

Such reinforcement wire rod is preferably wound in a spiral form along the outer layer 3 to form a net, or knitted along the outer layer 3 to weave a hollow cylindrical net. Therefore, the physical properties of the pressure resistant hose 10 such as pressure resistance performance and shape retaining performance can be improved.

In addition, as the constituent material of the outermost layer 6, a resin material having favorable close adhesion to the outer layer 3 is preferably used.

Example 1

The present invention will now be described in detail by way of Examples. It should be noted, however, that the present invention is not limited thereto.

1. Preparation of Each Layer-Forming Material 1-1. Inner Layer-Forming Material

An inner layer-forming material containing 100 mass % of polyethylene was prepared. It should be noted that the weight average molecular weight of the polyethylene was 80,000, the melting point of the inner layer-forming material was 131° C., and the MFI was 0.11 g/10 min.

1-2. Outer Layer-Forming Material

An outer layer-forming material containing 55.6 mass % of polyvinyl chloride and 44.4 mass % of DINP (plasticizer) was prepared. It should be noted that the weight average molecular weight of the polyvinyl chloride was 81,250, and the melting point of the outer layer-forming material was 135° C.

Various additives mentioned in the inner layer 2 may be also added to the polyvinyl chloride and the plasticizer as long as the characteristics of the outer layer 3 are not lost.

1-3. Interlayer-Forming Material

A mixture of a styrene grafted polyolefin and polystyrene ("Modic GK110" manufactured by Mitsubishi Chemical Corporation) as the first polyolefin, and a maleic anhydride modified ethylene-vinyl acetate copolymer ("ADMER NF528" manufactured by Mitsui Chemicals, Inc.) as the second polyolefin were mixed while changing the mixing ratios to prepare an interlayer-forming material. It should be noted that the melting point of the interlayer-forming material was 155° C. and the MFI was 6.9 g/10 min.

2. Production of Multilayer Tubular Molded Body

Example 1

The inner layer-forming material, the interlayer-forming material and the outer layer-forming material were melted and co-extruded using a three layer extruder to produce a multilayer tubular molded body having a three layer structure.

It should be noted that the thickness of the inner layer was 0.3 mm, the thickness of the interlayer was 0.3 mm, the thickness of the outer layer was 0.9 mm, the inner diameter was 12.4 mm and the outer diameter was 15.4 mm.

In addition, the MFI of polyethylene in the inner layer-forming material was 0.11 g/10 min, and the MFI of a mixture, containing the mixture of a styrene grafted polyolefin and polystyrene ("Modic GK110" manufactured by Mitsubishi Chemical Corporation) as the first polyolefin, and the maleic anhydride modified ethylene-vinyl acetate copolymer ("ADMER NF528" manufactured by Mitsui Chemicals, Inc.) as the second polyolefin in a mixing ratio of 90:10 by mass, the interlayer-forming material, was 6.9 g/10 min.

Examples 2 to 4

A multilayer tubular molded body was produced in the same manner as in Example 1 except that an interlayer-forming material having a different mixing ratio of the first polyolefin and the second polyolefin was used.

Comparative Example 1

A multilayer tubular molded body was produced in the same manner as in Example 1 except that an interlayer-forming material not containing the second polyolefin (i.e. interlayer-forming material containing 100 mass % of the first polyolefin) was used.

Comparative Example 2

A multilayer tubular molded body was produced in the same manner as in Example 1 except that an interlayer-forming material not containing the first polyolefin (i.e. interlayer-forming material containing 100 mass % of the second polyolefin) was used.

3. Evaluation 3-1. Chemical Resistance

About polyethylene (PE), polypropylene (PP) and polyvinyl chloride (PVC), the resistance to various drug solutions was evaluated. The evaluation test of chemical resistance was carried out by immersing a sample made of polyethylene, a sample made of polypropylene (PP) and a sample made of polyvinyl chloride into each drug solution at each predetermined temperature for 48 hours, then washing the samples with water, and observing the states thereof by visual inspection.

After this, chemical resistance was evaluated in accordance with the following evaluation criteria.

[Evaluation Criteria]

○○: a sample can be used without any trouble,

○: a sample is slightly influenced but sufficiently available depending on conditions, Δ: sufficient confirmation is required for use, and x: a sample is not suitable for use The evaluation results are shown in Table 1 below.

TABLE 1

| | Chemical name | TR (PVC) | PE | PP |
|---|---|---|---|---|
| Inorganic acid | Sulfurous acid (10%) | ○ | ○○ | ○○ |
| | Hydrochloric acid (20%, 80° C.) | x | Δ | ○ |
| | Hydrochloric acid (38%) | Δ | ○○ | ○○ |
| | Nitric acid (10%, 70° C.) | Δ | ○ | ○ |
| | Nitric acid (30%) | Δ | ○ | ○ |
| | Nitric acid (30%, 70° C.) | x | Δ | Δ |
| | Arsenic acid | ○ | ○○ | ○○ |
| | Sulfuric acid (10%, 70° C.) | x | ○ | ○○ |
| | Sulfuric acid (30%) | ○ | ○○ | ○○ |
| | Sulfuric acid (30%, 70° C.) | x | ○ | ○○ |
| | Sulfuric acid (98%) | x | Δ | Δ |
| Inorganic alkali | Caustic soda (30%) | Δ | ○○ | ○○ |
| | Caustic soda (30%, 70° C.) | x | ○ | ○ |
| Organic solvent | Acetone | x | Δ | Δ |
| | Ethyl cellulose | x | ○○ | ○○ |
| | Xylene | x | ○ | Δ |
| | Acetic acid (10%) | ○ | ○○ | ○○ |
| | Acetic acid (50%) | x | ○ | ○ |
| | Amyl acetate | x | Δ | Δ |
| | Diethyl sebacate | x | Δ | Δ |
| | Benzyl alcohol | x | ○ | ○ |
| | Toluene | x | Δ | Δ |
| | Methylethylketone | x | Δx | Δ |
| Others | Olive oil | Δ | ○ | ○ |
| | Gasoline | x | ○ | ○ |
| | Sodium hypochlorite (5%) | ○ | ○○ | ○○ |
| | Soybean oil | Δ | ○○ | ○○ |
| | Coconut oil | Δ | ○ | ○○ |

From the results shown in Table 1, it is found that polyethylene (PE) and polypropylene (PP) have higher resistant to all the drug solutions than that of polyvinyl chloride (PVC).

3-2. Adhesive Strength

The multilayer tubular molded body obtained in each of Examples and Comparative Examples was cut into a width of 25 mm at ordinary temperature, and the inner layer and the outer layer were pulled and separated using a tensile tester (tensile speed: 100 mm/min) to measure adhesive strength.

Subsequently, adhesive strength was evaluated in accordance with the following evaluation criteria.

[Evaluation Criteria]

○○: the adhesive strength is 40 N/25 mm or more,

○: the adhesive strength is 20 N/25 mm or more and less than 40 N/25 mm,

Δ: the adhesive strength is 10 N/25 mm or more and less than 20 N/25 mm, and x: the adhesive strength is less than 10 N/25 mm.

The evaluation results are shown in Table 2 below.

It should be noted that the first polyolefin and the second polyolefin are shown as "first PO" and "second PO" respectively in Table 2.

TABLE 2

| | Interlayer First PO:Second PO [mass ratio] | Adhesive strength |
|---|---|---|
| Comparative Example 1 | 100:0 | x |
| Example 4 | 95:5 | Δ |
| Example 1 | 90:10 | ○○ |
| Example 2 | 80:20 | ○ |
| Example 3 | 50:50 | Δ |
| Comparative Example 2 | 0:100 | x |

As shown in Table 2, the multilayer tubular molded bodies obtained in Examples had high adhesive strength between the inner layer and the outer layer via the interlayer. It was also verified that the adhesive strength was improved when the mixing ratios of the first polyolefin and the second polyolefin were changed.

Contrarily, the multilayer tubular molded bodies obtained in Comparative Examples had obviously low adhesive strength between the inner layer and the outer layer via the interlayer.

It should be noted that the multilayer tubular molded bodies obtained in Examples and Comparative Examples all did not have deformation after the heat resistance test and had excellent heat resistance by including the inner layer.

REFERENCE SIGN LIST

1 Multilayer tubular molded body
10 Pressure resistant hose
2 Inner layer
3 Outer layer
4 Interlayer
5 Reinforcement layer
6 Outermost layer
100 Plasma treatment equipment
200 Dielectric
210 Inner cavity
300 Internal electrode
310 Leader line
320 Leader line
330 Wire
400 Outer electrode
410 Leader line
420 Wire
500 Gas supply part
600 AC power supply
G Separation distance
P Pitch

What is claimed is:

1. A multilayer tubular molded body, characterized by having an inner layer containing a polyolefin as a main component, an outer layer containing polyvinyl chloride as a main component, and an interlayer, which is provided between the inner layer and the outer layer, has a function to attach the inner layer and the outer layer, and contains a first polyolefin having an aromatic ring on a side chain and a second polyolefin having an ester containing group on a side chain, wherein a ratio of an amount of the first polyolefin and an amount of the second polyolefin contained in the interlayer is 95:5 to 50:50 by mass, and wherein a total amount of the first polyolefin and the second polyolefin contained in the interlayer is 75 mass % or more.

2. The multilayer tubular molded body according to claim 1, wherein the first polyolefin comprises a styrene grafted polyolefin and polystyrene.

3. The multilayer tubular molded body according to claim 1, wherein the second polyolefin comprises a maleic anhydride modified ethylene-vinyl acetate copolymer.

4. The multilayer tubular molded body according to claim 1, wherein an amount of the polyolefin contained in the inner layer is 75 mass % or more.

5. The multilayer tubular molded body according to claim 1, wherein the polyolefin comprises at least one selected from a group consisting of polyethylene and polypropylene.

6. The multilayer tubular molded body according to claim 1, wherein an amount of the polyvinyl chloride contained in the outer layer is 40 to 70 wt %.

7. The multilayer tubular molded body according to claim 1, wherein a ratio of a thickness of the outer layer to a thickness of the inner layer is 1 to 10.

8. The multilayer tubular molded body according to claim 1, wherein an adhesive strength of the outer layer to the inner layer is 10 N/25 mm or more.

9. The multilayer tubular molded body according to claim 1, which is an integrated article by co-extrusion molding of the inner layer, the interlayer and the outer layer.

10. A method for producing the multilayer tubular molded body according to claim 9, the method being characterized by obtaining the multilayer tubular molded body by co-extrusion of an inner layer-forming material containing the polyolefin, an outer layer-forming material containing the polyvinyl chloride, and an interlayer-forming material containing the first polyolefin and the second polyolefin.

11. The method for producing the multilayer tubular molded body according to claim 10, comprising controlling the melting points of the layer-forming materials such that the absolute value of a difference between a melting point of the inner layer-forming material and a melting point of the outer layer-forming material is 1 to 40° C.

12. The method for producing the multilayer tubular molded body according to claim 10, comprising controlling the melting points of the layer-forming materials such that the absolute value of a difference between a melting point of the interlayer-forming material and a melting point of the inner layer-forming material is 5 to 35° C.

13. The method for producing the multilayer tubular molded body according to claim 10, comprising controlling the melt flow indices of the layer-forming materials such that the absolute value of a difference between a melt flow index of the interlayer-forming material and a melt flow index of the inner layer-forming material is 4.5 to 10 g/10 min.

* * * * *